(12) United States Patent
Ashfield

(10) Patent No.: US 9,501,774 B2
(45) Date of Patent: Nov. 22, 2016

(54) METHOD AND APPARATUS FOR USING AT LEAST A PORTION OF A ONE-TIME PASSWORD AS A DYNAMIC CARD VERIFICATION VALUE

(71) Applicant: BANK OF AMERICA CORPORATION, Charlotte, NC (US)

(72) Inventor: James M. Ashfield, Midlothian, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/008,066

(22) Filed: Jan. 27, 2016

(65) Prior Publication Data

US 2016/0314472 A1    Oct. 27, 2016

Related U.S. Application Data

(63) Continuation of application No. 11/559,931, filed on Nov. 15, 2006, now Pat. No. 9,251,637.

(51) Int. Cl.
| | |
|---|---|
| *G06K 5/00* | (2006.01) |
| *G06Q 20/40* | (2012.01) |
| *G06Q 20/34* | (2012.01) |

(52) U.S. Cl.
CPC ........ *G06Q 20/4018* (2013.01); *G06Q 20/341* (2013.01); *G06Q 20/409* (2013.01)

(58) Field of Classification Search
USPC ........................................................ 235/380
See application file for complete search history.

(56) References Cited

U.S. PATENT DOCUMENTS

| | | |
|---|---|---|
| 4,720,860 A | 1/1988 | Weiss et al. |
| 4,800,590 A | 1/1989 | Vaughan et al. |

(Continued)

FOREIGN PATENT DOCUMENTS

| | | |
|---|---|---|
| EP | 1338940 A1 | 8/2003 |
| EP | 1378870 A1 | 1/2004 |

(Continued)

OTHER PUBLICATIONS

On-Line E-Wallet System with Decentralized Credential Keepers. Mobile Networks and Applications 8 [online]. The Netherlands: The Kluwer Academic Publishers, 2003 [retrieved on Apr. 27, 2008]. pp. 87-99.

(Continued)

*Primary Examiner* — Rafferty Kelly
(74) *Attorney, Agent, or Firm* — Michael A. Springs; Moore & Van Allen PLLC; W. Kevin Ransom

(57) ABSTRACT

Method and apparatus for using at least a portion of a one-time password as a dynamic card verification value (CVV) are disclosed. A credit/debit card is able to generate a dynamic card verification value (CVV). Such a card may also include an indication that the dynamic CVV is to be used as a security code for purchasing or other transactions. A card-based financial transaction can be authorized in accordance with the use of a dynamic CVV by receiving a transaction authorization request for a specific credit/debit card, wherein the transaction authorization request includes a dynamic CVV. The dynamic CVV can be compared to at least a portion of a one-time password generated for the specific credit/debit card, and a transaction authorization can be sent to the merchant or vendor when the dynamic CVV matches all or a portion of the one-time password.

11 Claims, 6 Drawing Sheets

(56) References Cited

U.S. PATENT DOCUMENTS

| | | |
|---|---|---|
| 4,819,267 A | 4/1989 | Cargile et al. |
| 5,060,263 A | 10/1991 | Bosen et al. |
| 5,168,520 A | 12/1992 | Weiss et al. |
| 5,182,767 A | 1/1993 | Bernard |
| 5,216,716 A | 6/1993 | Bernard |
| 5,361,062 A | 11/1994 | Weiss et al. |
| 5,432,851 A | 7/1995 | Scheidt et al. |
| 5,577,121 A | 11/1996 | Davis et al. |
| 5,592,553 A | 1/1997 | Guski et al. |
| 5,627,355 A | 5/1997 | Rahman et al. |
| 5,638,444 A | 6/1997 | Chou et al. |
| 5,657,388 A | 8/1997 | Weiss |
| 5,661,807 A | 8/1997 | Guski et al. |
| 5,859,913 A | 1/1999 | Goreta et al. |
| 5,887,065 A | 3/1999 | Audebert et al. |
| 5,936,220 A | 8/1999 | Hoshino et al. |
| 5,937,068 A | 8/1999 | Audebert et al. |
| 5,963,643 A | 10/1999 | Goreta et al. |
| 6,012,636 A | 1/2000 | Smith et al. |
| 6,067,621 A | 5/2000 | Yu et al. |
| 6,163,771 A | 12/2000 | Walker et al. |
| 6,445,780 B1 | 9/2002 | Rosset et al. |
| 6,609,654 B1 | 8/2003 | Anderson et al. |
| 6,628,198 B2 | 9/2003 | Fieschi et al. |
| 6,641,050 B2 | 11/2003 | Kelley et al. |
| 6,704,715 B1 | 3/2004 | Rosset et al. |
| 6,715,082 B1 | 3/2004 | Chang et al. |
| 6,902,116 B2 | 6/2005 | Finkelstein |
| 6,928,558 B1 | 8/2005 | Allahwerdi et al. |
| 6,952,781 B1 | 10/2005 | Chang et al. |
| 6,957,185 B1 | 10/2005 | Labaton |
| 7,003,501 B2 | 2/2006 | Ostroff |
| 7,051,929 B2 | 5/2006 | Li |
| 2001/0054148 A1 | 12/2001 | Hoornaert et al. |
| 2001/0056409 A1 | 12/2001 | Bellovin et al. |
| 2002/0116617 A1 | 8/2002 | Talton, Sr. |
| 2002/0133713 A1 | 9/2002 | Fieschi et al. |
| 2002/0198848 A1 | 12/2002 | Michener |
| 2003/0011731 A1 | 1/2003 | Yoshida et al. |
| 2003/0046551 A1 | 3/2003 | Brennan |
| 2003/0084304 A1 | 5/2003 | Hon et al. |
| 2003/0126094 A1 | 7/2003 | Fisher et al. |
| 2003/0135739 A1 | 7/2003 | Talton, Sr. |
| 2003/0182241 A1 | 9/2003 | Everhart |
| 2003/0204732 A1 | 10/2003 | Audebert et al. |
| 2003/0208449 A1 | 11/2003 | Diao |
| 2003/0212894 A1 | 11/2003 | Buck et al. |
| 2004/0026495 A1 | 2/2004 | Finkelstein |
| 2004/0026506 A1 | 2/2004 | Finkelstein |
| 2004/0031856 A1 | 2/2004 | Atsmon et al. |
| 2004/0059952 A1 | 3/2004 | Newport et al. |
| 2004/0064706 A1 | 4/2004 | Lin et al. |
| 2004/0202325 A1 | 10/2004 | Margalit et al. |
| 2004/0255119 A1 | 12/2004 | Ukeda et al. |
| 2005/0015588 A1 | 1/2005 | Lin et al. |
| 2005/0043997 A1 | 2/2005 | Sahota et al. |
| 2005/0050330 A1 | 3/2005 | Agam et al. |
| 2005/0067485 A1 | 3/2005 | Caron |
| 2005/0069137 A1 | 3/2005 | Landrock |
| 2005/0166263 A1 | 7/2005 | Nanopoulos et al. |
| 2005/0182927 A1 | 8/2005 | Shatford |
| 2005/0182971 A1 | 8/2005 | Ong et al. |
| 2005/0188202 A1 | 8/2005 | Popp |
| 2005/0239440 A1 | 10/2005 | Chen et al. |
| 2005/0240528 A1 | 10/2005 | Hendrick |
| 2005/0269402 A1 | 12/2005 | Spitzer et al. |
| 2006/0015358 A1 | 1/2006 | Chua |
| 2006/0059346 A1 | 3/2006 | Sherman et al. |
| 2006/0174113 A1 | 8/2006 | Zahari |
| 2006/0242698 A1 | 10/2006 | Inskeep et al. |
| 2007/0136211 A1 | 6/2007 | Brown et al. |
| 2008/0029607 A1* | 2/2008 | Mullen ............... G06K 19/077 235/492 |
| 2008/0137861 A1 | 6/2008 | Lindmo et al. |

FOREIGN PATENT DOCUMENTS

| | | |
|---|---|---|
| GB | 2387999 A | 10/2003 |
| WO | 0163515 A1 | 8/2001 |
| WO | 01/67355 A2 | 9/2001 |
| WO | 0048064 A9 | 9/2001 |

OTHER PUBLICATIONS

Bank of America Corporation et al., "International Preliminary Report on Patentability," Jul. 3, 2007.
Canadian Office Action issued in 2,605,596 dated May 29, 2013.
Pocket device for authentication and data integrity on Internet banking applications. IEEE 0-7802/03 [online], [retrieved on Apr. 25, 2008]. pp. 43-50.
Korean Office Action for KR Application No. 10-2007-7027029 dated Jul. 18, 2012.
Chinese Patent Office; Second Office Action; Jul. 12, 2010; issued in Chinese Patent Application No. 200680022761.0.
European Patent Office, Examination Report, Apr. 29, 2010, 5 pgs.
European Patent Office, Examination Report, Mar. 4, 2008, issued in European Patent Application No. 06758494.6.
Mexican Patent Office, Office Action, May 5, 2010, issued in Mexican Patent Application No. MX/a/2007/013218.
Chinese Patent Office; First Office Action; Nov. 6, 2008; issued in Chinese Patent Application No. 200680022761.0.
Bank of America Corporation, International Application No. PCT/US2006/015218, International Search Report, Aug. 22, 2006.
Bank of America Corporation, International Application No. PCT/US2006/015218, Written Opinion, Aug. 22, 2006.
Bank of America Corporation, PCT International Search Report, issued in corresponding International Patent Application No. PCT/US2007/084529, Jun. 4, 2008.
Bank of America Corporation, PCT Written Opinion, issued in corresponding International Patent Application No. PCT/US2007/084529, Jun. 4, 2008.
International Preliminary Report on Patentability and Written Opinion of the International Searching Authority mailed May 28, 2009 for International Application No. PCT/US2007/084529.
Database Inspec [Online], The Institution of Electrical Engineers, Stevenage, GB; Feb. 14, 2007, (Feb. 14, 2007) Molloy I et al.: "Dynamic Virtual Credit Card Numbers", XP002480816, Database accession No. 9721118.
Extended search report issued by the European Patent Office for related European Patent Application No. 10012051.8 dated May 24, 2011.

* cited by examiner

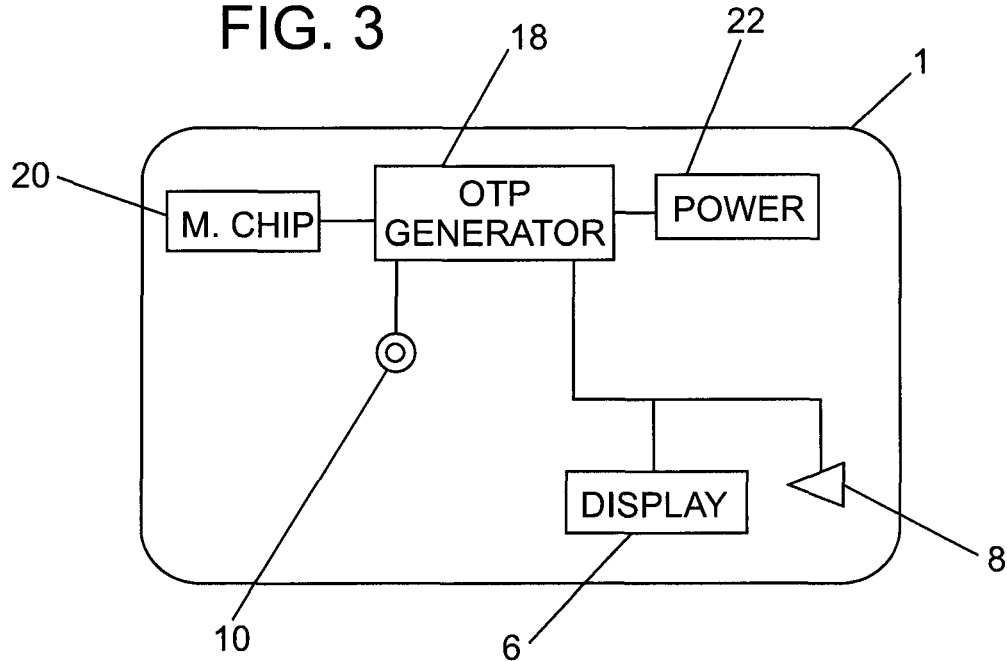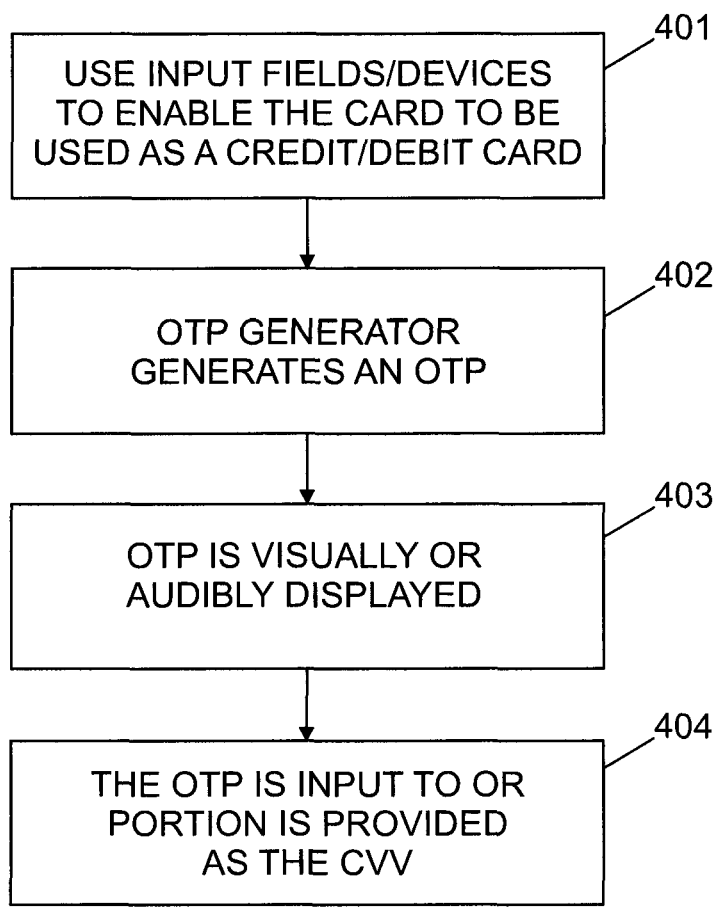

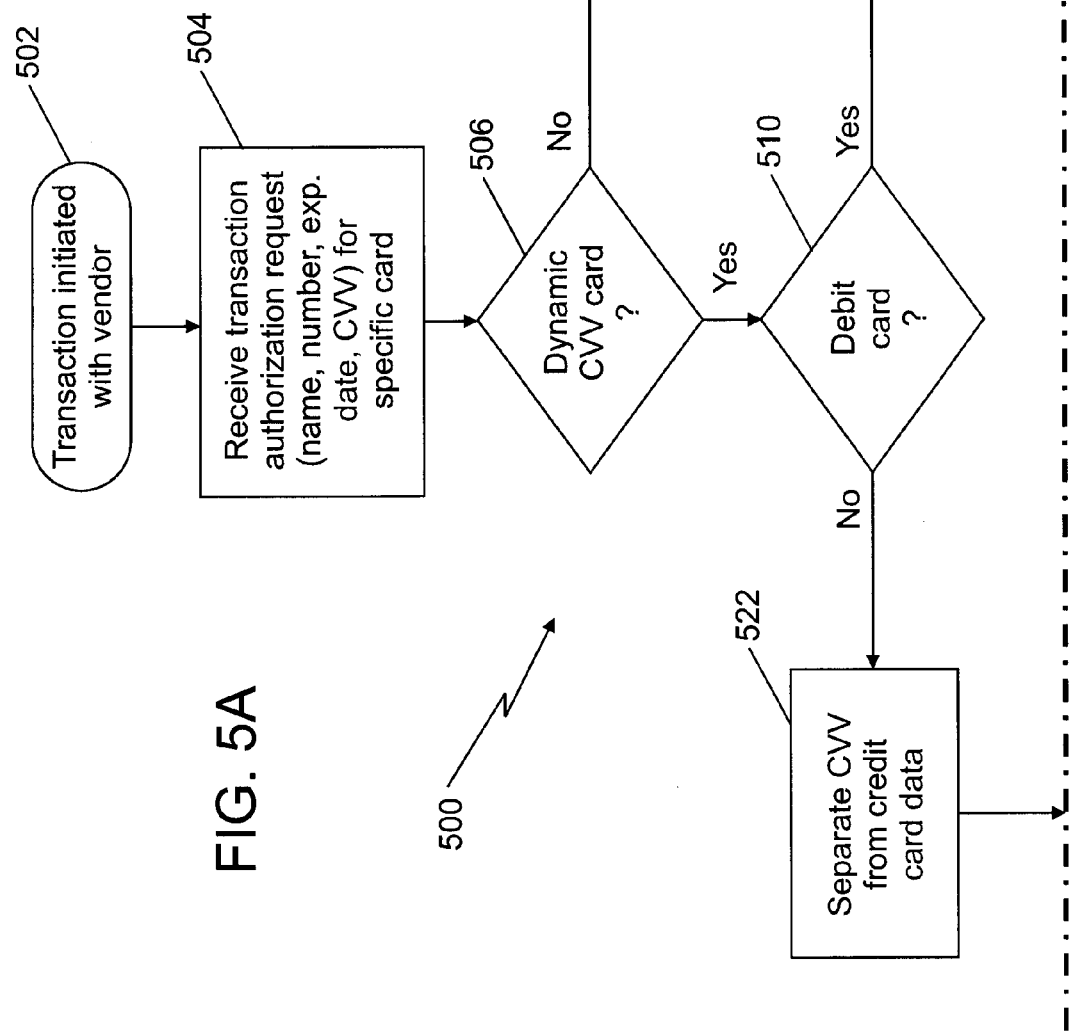

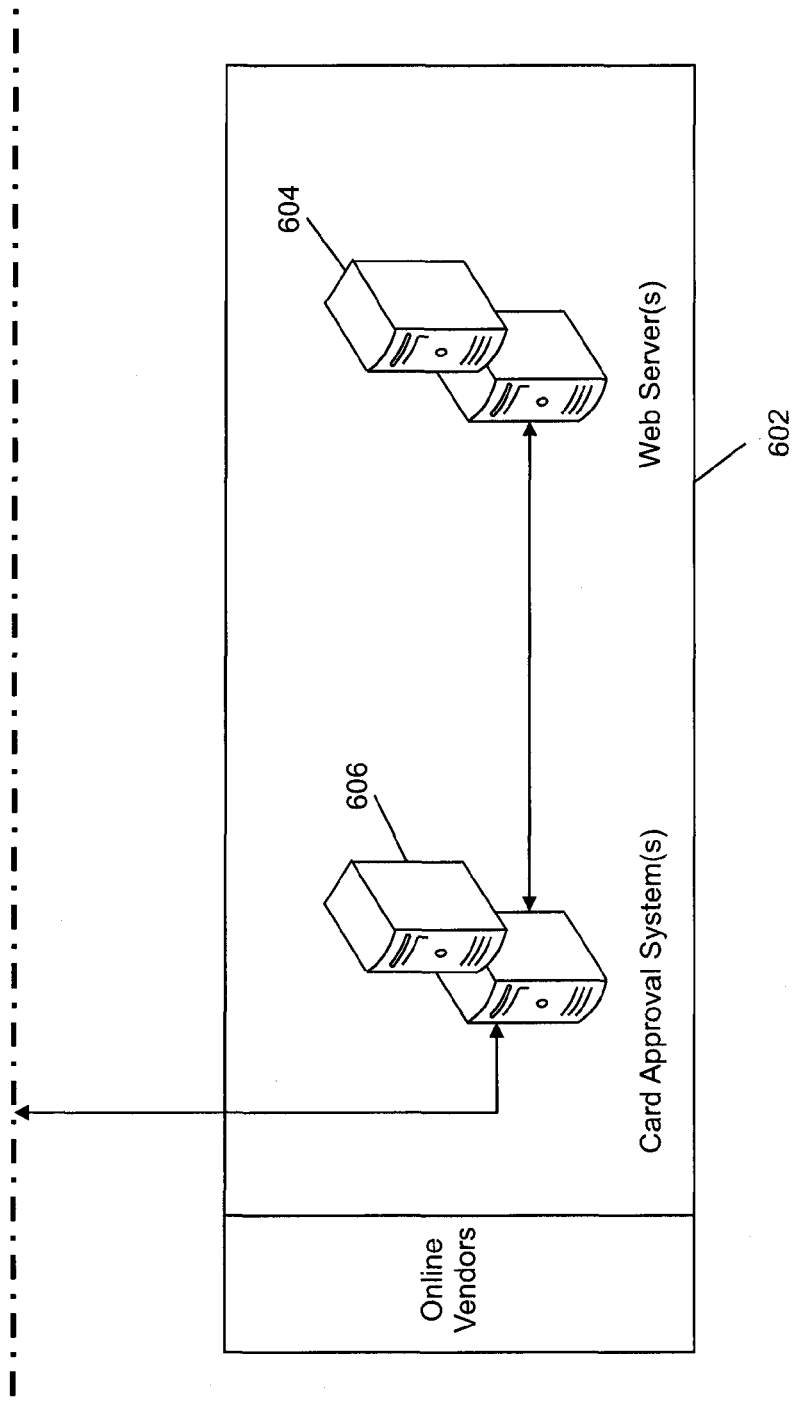

METHOD AND APPARATUS FOR USING AT LEAST A PORTION OF A ONE-TIME PASSWORD AS A DYNAMIC CARD VERIFICATION VALUE

CROSS-REFERENCE TO RELATED APPLICATIONS

This application is a continuation of U.S. patent application Ser. No. 11/559,931, filed Nov. 15, 2006; the contents of which are hereby incorporated by reference.

BACKGROUND

Identity verification methods related to authenticating and/or verifying users for access to secured systems are well known. One such method involves assigning a password to a user. When the user desires access to the secured system, the user inputs his or her ID and password to the system. The system confirms that the input password corresponds to the stored user ID and enables user access to the system. An enhanced version of this security technology is known as one-time password (OTP) authentication. OTP authentication uses a password that is transitory and only valid for a single use such that once used, the OTP is not valid for later access. The OTP may be time-based or event-based. Thus, even if the OTP is obtained by misappropriation, the possibility that it can be used to gain access to a system is very limited. The OTP is typically generated by a token possessed by the user and is input to an authentication system. The input OTP is compared to an OTP generated by the system using the same information and encryption algorithm as is used by the token. If the input OTP matches the OTP generated at by the system, the user is allowed access to the system.

The banking industry has developed a type of "password" for use with credit and debit cards. This password takes the form of an authentication code and is commonly referred to in the industry as a "card verification value" or "CVV." The CVV is formatted and used according to accepted industry standards. Initially, the CVV was an extra numeric string encoded on the magnetic stripe of credit and debit cards. More recently, an additional three-digit code has been printed on the backs of credit and debit cards. This printed code is commonly referred within the banking industry to as a "CVV2" code and the magnetically stored code is commonly referred to as a "CVV1" code. The printed code can be requested and verified by merchants in transactions where the merchant has no other way of actually verifying that the customer has possession of the physical card. For example, in on-line shopping transactions, the consumer can be prompted to enter the CVV2 code from the back of his or her card. The CVV2 code can provide some assurance that the consumer has possession of the physical credit or debit card. A printed CVV code is often referred to by consumers and on-line vendors as a "3-digit security code", "security code" or as "check digits."

SUMMARY

In example embodiments of the invention, a credit/debit card is able to generate a dynamic card verification value (CVV). In some embodiments, the credit card has a body the size and shape of a standard credit/debit card, and a one-time password generator disposed within the body to generate the dynamic CVV. In some embodiments, a display disposed within the body displays the dynamic CVV. Such a card may also include an indication that the dynamic CVV is to be used as a security code for purchasing or other transactions.

In some embodiments, the one-time password generator generates a one-time password and the dynamic CVV comprises a portion of the one-time password. An indication of a portion of the one-time password to be used as a dynamic CVV can be provided as highlighting of a portion of the one-time password display, instructions printed on the card body, or both. The credit/debit card can include a magnetic stripe as a validation device, and/or can be a smart card.

In some embodiments, a card-based financial transaction can be authorized in accordance with the use of a dynamic CVV by receiving a transaction authorization request for a specific credit/debit card, wherein the transaction authorization request includes a dynamic CVV. The dynamic CVV can be compared to at least a portion of a one-time password generated for the specific credit/debit card, and a transaction authorization can be sent to the merchant or vendor when the dynamic CVV matches all or a portion of the one-time password. A transaction denial can be sent when the dynamic CVV does not match. In some embodiments, the portion of the one-time password may be three digits of a six-digit one-time password. During processing the bank systems can separate the dynamic CVV from credit/debit card data, validate the credit/debit card data, and then merge the CVV with the credit/debit card data once the dynamic CVV is authenticated to produce the transaction authorization.

A system for authorizing card-based financial transactions according to some example embodiments of the invention can include a card approval server to receive transaction authorization requests and an intermediate server to identify the dynamic CVV from a static CVV and to separate the dynamic CVV from credit/debit card data. A database can be interconnected with the card approval server and the intermediate server to validate the credit/debit card data. An authentication server can be interconnected with the intermediate server to compare the dynamic CVV with at least a portion of a one-time password to authenticate the dynamic CVV. In some embodiments, the system can include two databases; a credit card database, and a debit card database. In some embodiments, the intermediate server can be disposed within a middleware layer.

A system according to example embodiments of the invention may take the form of, or be enabled by a computer program product including a computer usable medium encoded with computer usable program code. Such computer usable code coupled with operating systems and appropriate instruction execution systems such as the servers described above can form the means to carry out embodiments of the invention.

BRIEF DESCRIPTION OF THE DRAWINGS

FIG. 3 is a functional block diagram of a credit/debit card according to an embodiment of the invention.

FIG. 4 is a flowchart illustrating an example use of a credit/debit card according to example embodiments of the invention.

FIG. 5 is composed of FIG. 5A and FIG. 5B, which together depict a flowchart illustrating the processing of a transaction using a dynamic CVV card according to at least some embodiments of the present invention.

FIG. 5A is a top portion of the flow chart of FIG. 5 illustrating the processing of a transaction using a dynamic CVV card according to at least some embodiments of the present invention.

FIG. 6 is composed of FIG. 6A and FIG. 6B, which together depict a system block diagram of a system for processing card transactions according to example embodiments of the present invention.

FIG. 6B is a bottom portion of the flow chart of FIG. 6 depicting a system block diagram of a system for processing card transactions according to example embodiments of the present invention.

DETAILED DESCRIPTION OF THE INVENTION

Figure 1:
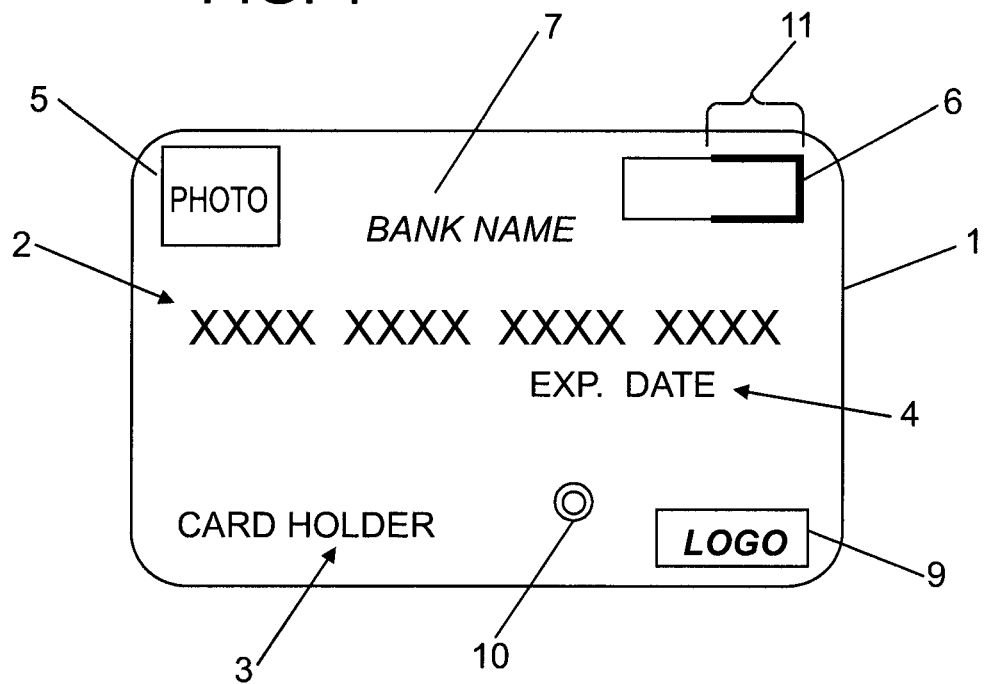
FIG. 1 is a front view of a credit/debit card according to an embodiment of the invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of a hardware embodiment, a software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions, or may be human-performed unless otherwise stated. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The term "bank" and any similar terms are used herein in their broadest sense. Financial institutions that process transactions of the types discussed can include stock brokerages, credit unions, credit card processing companies such as Visa and American Express, and other types of institutions which are not strictly banks in the historical sense. The use of terms such as bank, "financial institution", "card issuer", or the like herein is meant to encompass all such possibilities. Additionally, the terms "credit card", "debit card", "credit/debit card" and the like can refer to any type of financial transaction card or ATM card, in any form factor. Such terms may also refer to a so-called "smart" card. It should also be noted that reference to "one-time passwords" and the like is not necessarily limited to the classical case of passwords generated to access on-line systems. Rather, this terminology is intended to invoke any systems, methods, concepts, and apparatus connected with generating a value that changes in any automated fashion with time or use that is used to authenticate access to any resources or the use of a device or article of manufacture.

Embodiments of the present invention contemplate a card issuer producing and distributing a credit card with an OTP generator embedded therein. Such a device can serve as a combination conventional financial transaction card and OTP generator. The OTP can be generated using existing algorithms. A visual and/or audio display is provided on the card to output the OTP to the user. The end user inputs the OTP to access systems on-line, telephonically or otherwise. The credit/debit card functionality of the device can be used apart from its use as an OTP generator. By combining the OTP token and a credit/debit card, the OTP generator can be conveniently carried without increasing the number of personal effects carried by the user.

It is convenient for a bank to provide a card as described above and use the OTP functionality as an access mechanism for its on-line banking systems. When the user depresses a button on his or her credit/debit card, an OTP algorithm generates an OTP. The OTP is visually displayed and the user can input the OTP to the on-line banking system where it is authenticated to allow the user to access secure system resources. The combination of the credit/debit card with the OTP functionality eliminates the need for the user to carry a separate OTP token and will make the use of OTP technology more acceptable to bank customers. However, according to the example embodiments of the present invention, the bank can implement systems to enable use of the OTP generated on a customer's card, or at least a portion of the OTP, in place of the card verification value (CVV) that would otherwise be printed on the back of the card. In this way, the security advantages of the OTP can be realized in transactions with third parties as well as with the issuing bank by providing a dynamic CVV for credit card transactions.

Figure 2:
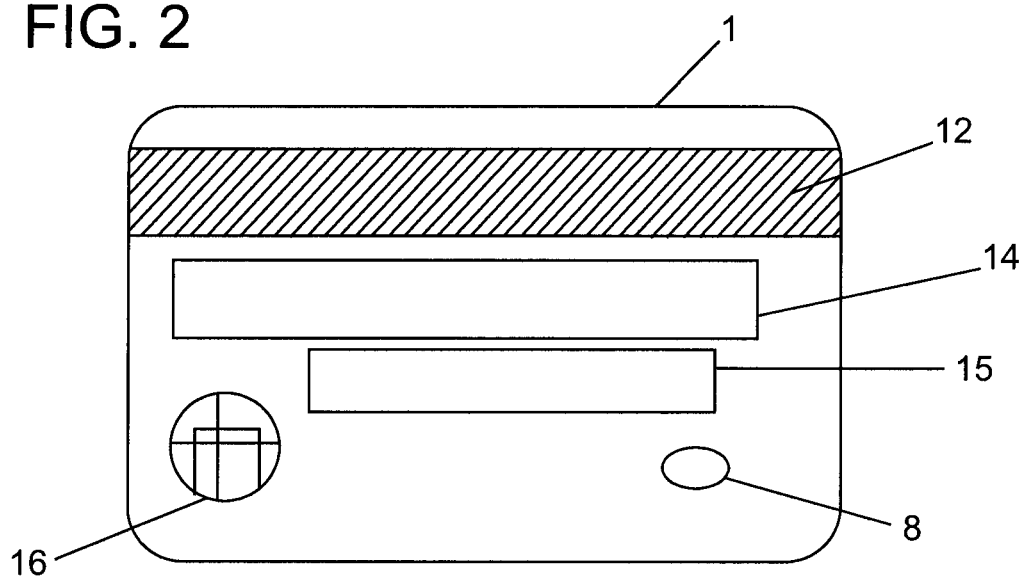
FIG. 2 is a back view of a credit/debit card according to an embodiment of the invention.

FIG. 1, FIG. 2, and FIG. 3 illustrate a card that is designed to have the last three digits of an OTP from the built-in OTP generator as a CVV2 value. It should be noted that this illustration is an example only. CVV systems could be devised to use more or less than three digits of the OTP. Additionally, an OTP generator algorithm could be used to generate a code having only three digits, or any other number of digits, that is only intended to be used as a CVV. In such a case, the term "one-time password" is synonymous with "dynamic CVV" and these two terms can be used interchangeably. It should also be noted that the use of an OTP for a CVV could be accomplished with a separate OTP token, albeit somewhat less conveniently. An OTP or dynamic CVV does not have to contain only numeric characters, but could also contain alpha characters or other symbols.

Referring to FIG. 1 an OTP credit/debit card that might be used with an embodiment of the invention comprises a plastic card 1 having the size and shape of a conventional credit card. Conventional credit/debit cards are approximately 3⅜ inches×2⅛ inches×⅛ of an inch. Smaller credit cards are also known. One such card is the MINI-CARD that is approximately 2½ inches×1½ inches×⅛ of an inch and is distributed by Bank of America Corporation. The card may be provided in any conventional credit card size. The card may be provided with raised card numbers 2, card holder name 3, expiration date 4 and card holder photograph and/or hologram 5 as is known in the art. The card 1 also may include issuer information such as bank name 7 and logo 9. A display 6 is provided for visually displaying the OTP generated by card 1. Also located on card 1 is an initiation button 10 that is depressed by the user to initiate the generation of the OTP. The rightmost half of display 6 is surrounded by visual highlighting 11 in the form of a printed outline, as an indication to the consumer that the rightmost three digits of the OTP, which would normally fall inside the highlighting are to be used as a CVV in place of the three digit code that would normally be printed on the back of a typical credit card, typically referred to as a "security code" by consumers and on-line vendors. This highlighting can be accomplished in almost infinite ways, including coloring of the display window or background. The highlighting might also be absent altogether, in which case the financial institution would rely on user knowledge, either apart from the card itself, or based on printed instructions on the back of the card (see below).

Referring to FIG. 2 the back of card 1 is shown and may include a magnetic stripe 12 coded with information about the card as is known in the art and a signature block 14. Note that in this case, signature block 14 does not include a printed, 3-digit CVV2 code. Instead, instructions indicating that the consumer is to use the OTP or a portion thereof as the CVV or "security code" when prompted can be printed on the card, for example, under the signature block in printed area 15. This indication in area 15 can be in addition to or instead of any indication on the front of the card. A speaker 8 may also be provided for generating an audio signal of the OTP, either in addition to or instead of the visual display. A standard smart card contact interface 16 may also be provided. Smart card interface 16 may be located on the front of card 1 instead of on the back of the card as shown.

Referring to FIG. 3 card 1 includes an OTP generator 18 that includes internal memory or memory could be provided on a separate memory chip 20. Where memory is provided on the OTP generator 18, the separate memory chip 20 may be omitted. The OTP generator 18 used in the card of the invention may comprise the microprocessor used in the standard smart card. The ISO 7816 international standard defines the design parameters of the smart card. Smart cards may have 1 kilobyte of RAM, 24 kilobytes of ROM, 16 kilobytes of programmable ROM, and an 8-bit microprocessor running at 5 MHz. In place of the general purpose processor OTP generator 18 may comprise a dedicated integrated chip, memory chip or other processing technology.

If the OTP credit/debit card is provided with full smart card functionality, a single processor may be used to generate the OTP and provide the smart card functionality. Smart cards require a power source and a mechanism to communicate with a smart card reader. Some smart cards have contact pads such as gold plates 16 at one corner of the card. This type of smart card is known as a contact smart card. The plates 16 are used to supply the necessary energy to the card and to communicate via direct electrical contact with the smart card reader. For some smart cards the connection between the reader and the card is done via radio frequency (RF). The cards have a small wire loop embedded inside that is used as an inductor to supply the energy to the card and communicate with the reader. When a card is inserted into the card readers RF field, an induced current is created in the wire loop and used as an energy source. The standards relating to smart card interfaces are ISO 14443 and ISO 15693 for contactless cards. EMV 2000 version 4.0, published December 2000, define specifications to allow interoperability between smart cards and smart card readers on a global basis.

The card used with an embodiment of the invention could include either contact, RF connections or both; however, because the OTP functionality in the card of this example is intended to be used separate from any smart card functionality, a power source 22 is provided on the card 1. Power source 22 may comprise a built in battery cell of the miniature button type. It cannot be over-emphasized that the card described above is but an example only. A completely externally powered card could also be used as a dynamic CVV card with embodiments of the invention.

The card 1 uses a validation device or devices and functionality that enable the card to function as a conventional credit/debit card. The validation device may comprise the magnetic stripe, signature block, authentication code, card number and expiration date, photo and/or other security devices as are known in the art. Moreover, the validation device and functionality may comprise full smart card functionality where the smart card microprocessor communicates with the card reader as previously described to authenticate the card as is known in the art.

In order to generate the OTP, a hashed message authentication code (HMAC) one-time password algorithm (HTOP) may be used. OTP algorithms are well known and are commercially available. A time/clock-based algorithm could also be used. Other suitable OTP algorithms may also be used. The algorithm can be stored in memory 20 or in the OTP generator 18. OTP generator 18 generates the OTP when the system is initiated by the user by depressing button 10. Button 10 may consist of a film capacitance button. A third type of OTP algorithm is based on a challenge issued by the system. The challenge is entered into the card 1 and the OTP algorithm generates the OTP based on the challenge. A challenge based algorithm may require a complement of buttons to provide the alpha-numeric input. These buttons also may consist of film capacitance buttons.

Referring to FIG. 4, the card 1 can function as a credit/debit card including a dynamic CVV function. Process 400 of FIG. 4 illustrates the process of using such a card from the cardholder's perspective. Like most flowcharts, FIG. 4 illustrates a process as a series of process blocks. The normal card information is input to a system at block 401 and includes the routine information that allow the card to be used as a credit/debit card, such as the cardholder's name, the card number, and the expiration date. This can be input via a card reader or verbally, but in the case of on-line purchasing transactions, would most likely be input by the user typing the relevant information into fields on a World Wide Web page. In addition to the debit/credit card functionality, card 1 also functions as an OTP and/or dynamic CVV generator. In an on-line transaction, the Web page may include a field for a CVV2 code and may refer to this field as a space for the "security code" from the back of the credit card. At block 402, when the user depresses button 10, OTP generator 18 utilizes an OTP algorithm to generate an OTP and or CVV. The OTP/CVV is visually displayed at block 403 on display 6 or audibly uttered by speaker 8. The user inputs the CVV, which may be a portion of an OTP, at block 404 to allow the user to complete the transaction. In other situations, the user may input the dynamic CVV value by orally presenting it over a voice system such as by telephone, or otherwise.

Figure 5B:
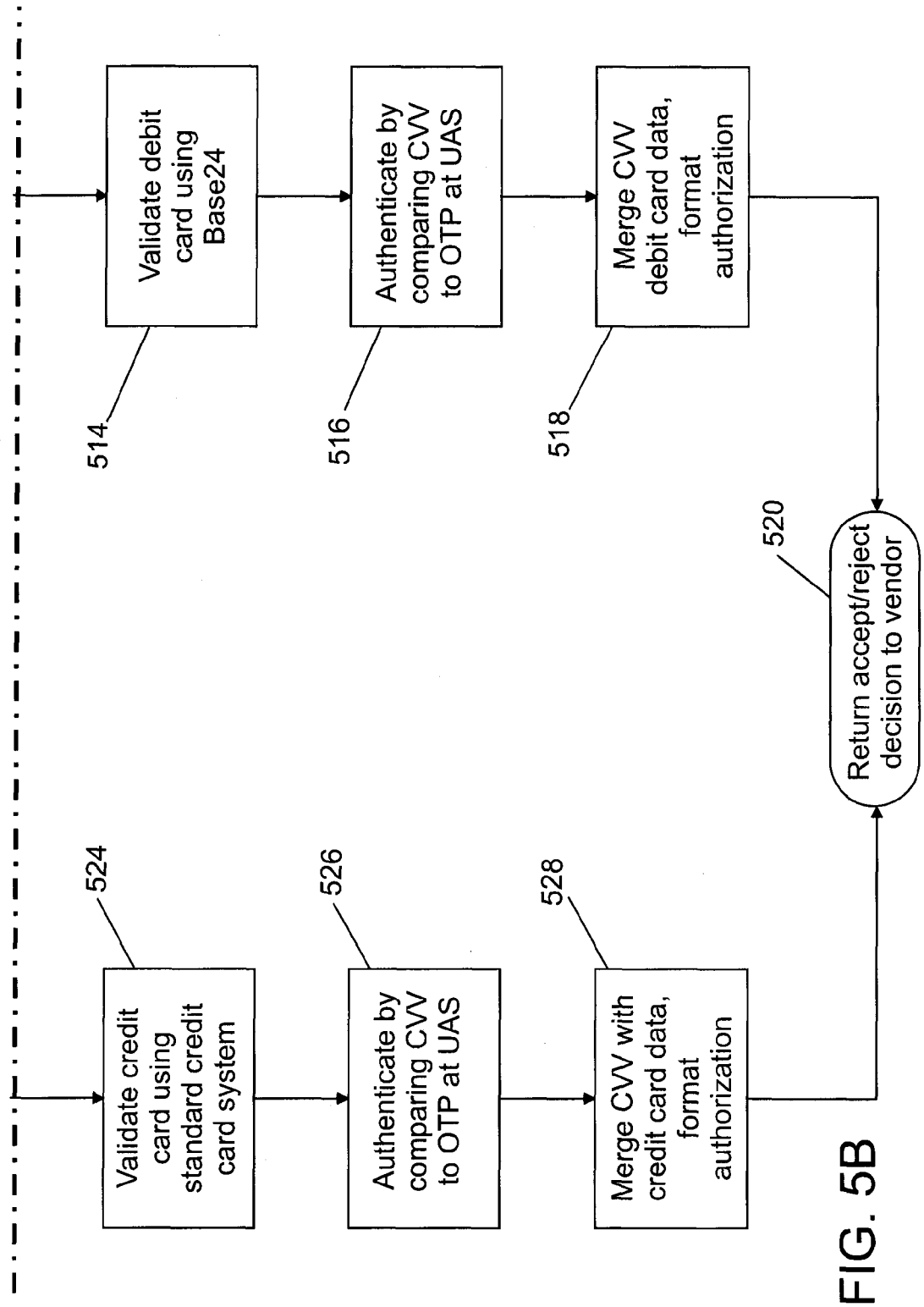
FIG. 5B is a bottom portion of the flow chart of FIG. 5 illustrating the processing of a transaction using a dynamic CVV card according to at least some embodiments of the present invention.

FIG. 5 is composed of FIG. 5A and FIG. 5B, which depict a flowchart diagram which illustrates the process of handling authorizations for transactions using a dynamic card verification value (CVV) card as described above. Like most flowchart illustrations, FIG. 5A and FIG. 5B illustrate process 500 as a series of process blocks. For purposes of this disclosure, "credit card data" as well as "debit card data" and "credit/debit card data" refers to the standard package of information that describes a payment card for use in a transaction, such as, card number, expiration date, card holder name, etc. For purposes of this example, assume a card according to an embodiment of the invention is being used in an online transaction. It cannot be overemphasized that this is but one use of such a card. Referring to FIG. 5A, at block 502, the transaction is initiated with a vendor or seller. At block 504, the financial institution receives a transaction authorization request, which includes the credit card data and a CVV, although the CVV at this point in the process may be a dynamic or static CVV. At block 506 a determination is made as to whether the CVV received with the credit card data is a dynamic CVV. If not, processing branches to block 508 where the card authorization is handled as is known in the art. When a dynamic CVV is included, processing branches to block 510.

Still referring to FIG. 5A, at block 510, a determination is made as to whether the credit card data identifies a credit card or a debit card. In this example embodiment, credit card and debit cards are processed by different systems. It cannot be overemphasized that this is but an example only, and a financial institution could set up a system in which either type of card is processed in the same manner. If the card is a debit card, processing proceeds to block 512 where the CVV is separated from the debit card data. Referring now to FIG. 5B, block 514, the debit card data is validated using a "Base24" system. Base24 is a standard processing engine for debit cards that is known throughout the financial services industry. Base24 solutions are available. At block 516, the dynamic CVV from the card is authenticated by comparing that to a one-time password generated by the system. In example embodiments, this authentication is handled by a United Authentication Server (UAS), a known OTP product. Once an authentication decision is reached, the dynamic CVV is merged with the credit/debit card data at block 518 in order to provide an authorization or denial as the case may be. A file communicating an authorization or denial contains all of this information so that the vendor can process such a response. The decision via this file is then returned to the vendor systems at block 520.

Referring back to FIG. 5A, if the dynamic CVV card to be authorized is not a debit card, it is a credit card and processing branches to block 522, where the dynamic CVV is again separated from the credit card data. Referring now to FIG. 5B, at block 524 the credit card data is validated using standard credit card authorization technology as is known in the art. At block 526, the CVV is again authenticated using OTP technology, in this example, a United Authentication Server as previously described. At block 528, the CVV is again merged with the credit card data in order to format the transaction authorization or denial. Again, at block 520, a transaction authorization or transaction denial is returned to the requesting vendor. The transaction authorization accepts the card for payment, while a transaction denial constitutes a rejection of the card for payment.

Figure 6A:
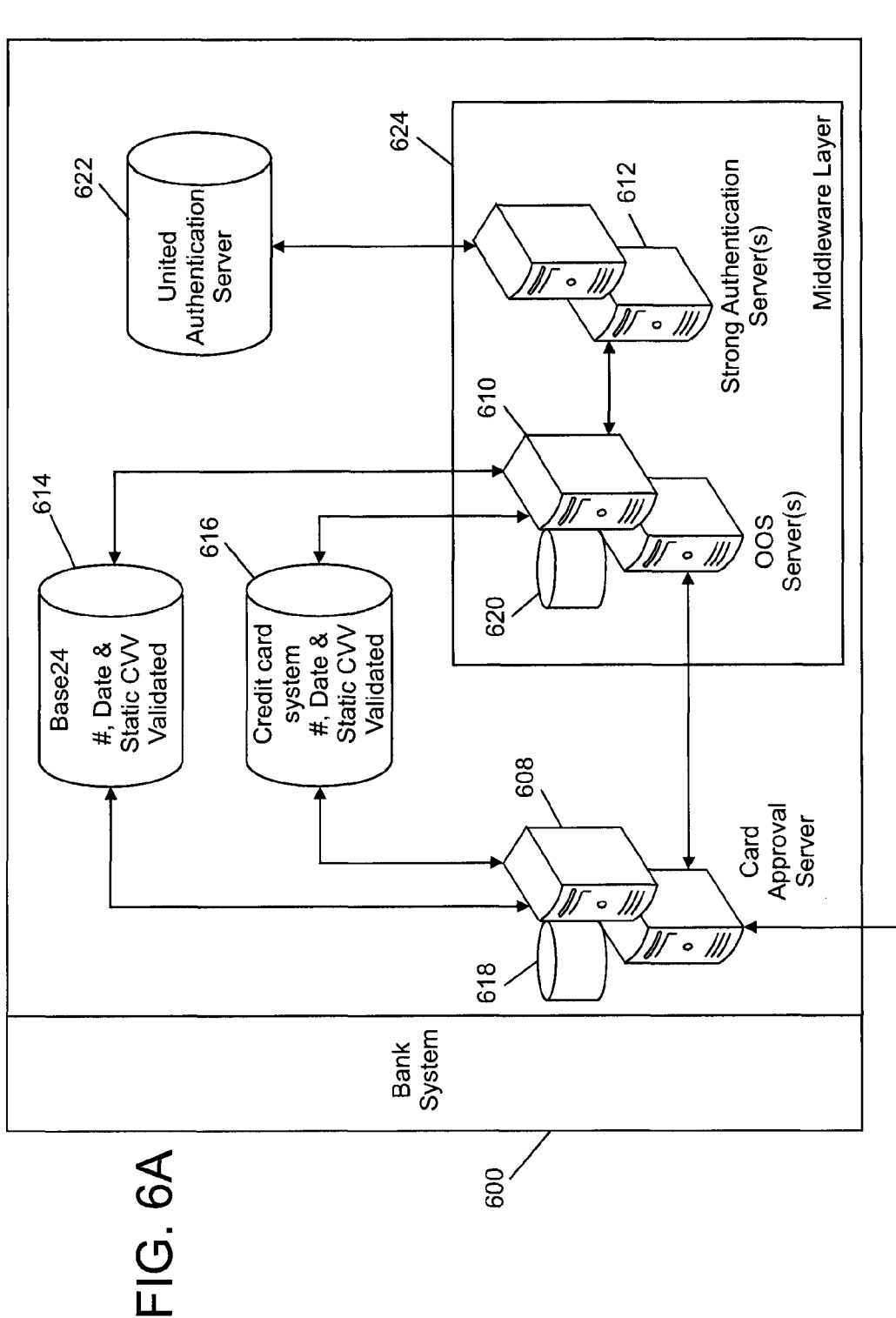
FIG. 6A is a top portion of the flow chart of FIG. 6 depicting a system block diagram of a system for processing card transactions according to example embodiments of the present invention.

FIG. 6 is composed of FIG. 6A and FIG. 6B, which depict a system block diagram showing various subsystems, databases, and instruction execution platforms which may be used to implement some embodiments of the invention. It can be assumed for purposes of the example of FIG. 6A and FIG. 6B that all of the systems and databases are interconnected through various networking means as is known in the art. For purposes of this example, bank or financial institution system 600 of FIG. 6A is illustrated in communication with online vendor systems, 602 of FIG. 6B. As illustrated in FIG. 6B, the online vendor systems include Web server 604 as well as credit and debit card approval system 606. The approval system 606 of FIG. 6B communicates with bank system 600 of FIG. 6A in typical fashion, usually via a secured connection over the public Internet. As illustrated in FIG. 6A, bank system 600 includes various intermediate servers, such as a card approval server, 608; an object oriented streaming (OOS) server, 610 and a strong authentication server, 612. In a typical installation, these servers may include multiple hardware platforms to implement each type of server, for reliability and redundancy.

Still referring to FIG. 6A, system 600 includes various databases to provide card approval information. These databases include the previously discussed Base24 database, 614, and the standard credit card approval system database, 616. Note that these databases are directly interconnected with the card approval server in order to process cards static CVV cards as is known in the art. However, server 608 and server 610 include computer program code instructions disposed on media 618, 620, or both, in order to identify dynamic CVV card authorization requests, and manage the authentication of one-time passwords used as CVV security codes. Since in such cases, OOS server 610 must communicate with the card approval databases in order to validate the credit/debit card data, connections are included from server 610 to databases 614 and 616.

In the example embodiment of FIG. 6A, requests for authentication of dynamic CVV information against an internally generated one-time password are managed by strong authentication server 612 in communication with United Authentication Server 622. In the example embodiment of FIG. 6A, both the OOS server and the strong authentication server are disposed within middleware layer 624. Middleware layer 624 includes all the middleware components necessary to coordinate activities between various servers and databases as is known in the art. It cannot be overemphasized that the architecture illustrated in FIG. 6A is but an example only. It is possible to architect various configurations of servers and databases to handle dynamic CVV cards according to embodiments of the invention. The functions of multiple servers or databases could be combined. Indeed, all of the functions of system 600 could be combined on a computer system with attached media on which the various computer program code instructions and databases needed to implement the invention may reside.

The flowcharts and block diagrams in the figures illustrate the architecture, functionality, and operation of possible implementations of systems, methods and computer program products according to various embodiments of the present invention. In this regard, each block in the flowchart or block diagrams may represent an action or a portion of a system, which comprises one or more actions, functions, or articles for implementing the specified logical steps. These functions and/or logical steps may be implemented by people, computer program products, or a combination of the two. It should also be noted that, in some alternative implementations, the functions described herein may occur on an order different than the order presented. It should also be noted that functions or steps and combination of functions or steps described herein can be implemented by special purpose hardware-based systems either alone or assisted operators which perform specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer program product located on a non-transitory medium, which is readable by one or more computing devices, wherein the computer program code is used for authorizing a transaction, where the transaction involves a credit/debit card,
wherein the credit/debit card comprises:
a visual display;
a speaker;
one or more input devices positioned on the credit/debit card configured to receive as an input a challenge response, wherein the one or more input devices comprise two or more buttons corresponding to a plurality of alpha-numeric characters;
a processor in communication with the one or more input devices positioned on the credit/debit card, wherein the processor is configured to:
generate a challenge;
present, via the visual display and the speaker of the credit/debit card, the challenge;
receive, via the plurality of buttons on the credit/debit card, a challenge response comprising alpha-numeric characters; and
determine whether or not the challenge response received into the credit/debit card is successful; and
a one-time password generator automatically generating a one-time password or value based at least partially on receiving the challenge response into the credit/debit card and determining that the challenge response is successful,
wherein the computer program product comprises instructions for operation by one or more computing devices to cause said one or more computing devices to:
receive a transaction authorization request associated with the transaction involving the credit/debit card, wherein the transaction authorization request comprises a prompt for a card verification value (CVV) for authenticating the transaction;
present, via the visual display and the speaker of the credit/debit card, the one-time password, wherein a portion of the one-time password comprises a dynamic card verification value (CVV) for authenticating the transaction;
receive the dynamic CVV;
comparing the dynamic CVV generated by the credit/debit card to at least a portion of an externally generated one-time password for the credit/debit card; and
authorize the transaction involving the credit/debit card if the dynamic CVV generated by the credit/debit card matches at least a portion of an externally generated one-time password for the credit/debit card.

2. The computer program product of claim 1 further comprising instructions for operation by one or more computing devices to cause said one or more computing devices to send a transaction denial when the dynamic CVV does not match the at least a portion of the one-time password.

3. The computer program product of claim 1, wherein the at least a portion of the one-time password comprises three digits of a six-digit one-time password.

4. The computer program product of claim 1 further comprising instructions for operation by one or more computing devices to cause said one or more computing devices to:
separate the dynamic CVV from credit/debit card data;
validate the credit/debit card data; and
merge the dynamic CVV with the credit/debit card data to produce the transaction authorization.

5. The computer program product of claim 1, wherein the dynamic CVV is based at least partially on the challenge response input by the user into the credit/debit card.

6. A method for authorizing a transaction, wherein the transaction involves a credit/debit card,
wherein the credit/debit card comprises:
a visual display;
a speaker;
one or more input devices positioned on the credit/debit card configured to receive as an input a challenge response, wherein the one or more input devices comprise two or more buttons corresponding to a plurality of alpha-numeric characters;
a processor in communication with the one or more input devices positioned on the credit/debit card, wherein the processor is configured to:
generate a challenge;
present, via the visual display and the speaker of the credit/debit card, the challenge;
receive, via the plurality of buttons on the credit/debit card, a challenge response comprising alpha-numeric characters; and
determine whether or not the challenge response received into the credit/debit card is successful; and
a one-time password generator automatically generating a one-time password or value based at least partially on receiving the challenge response into the credit/debit card and determining that the challenge response is successful,
wherein the method comprises:
receiving a transaction authorization request associated with the transaction involving the credit/debit card, wherein the transaction authorization request comprises a prompt for a card verification value (CVV) for authenticating the transaction;
presenting, via the visual display and the speaker of the credit/debit card, the one-time password, wherein a portion of the one-time password comprises a dynamic card verification value (CVV) for authenticating the transaction;
receiving the dynamic CVV;
comparing the dynamic CVV generated by the credit/debit card to at least a portion of an externally generated one-time password for the credit/debit card; and
authorizing the transaction involving the credit/debit card if the dynamic CVV generated by the credit/debit card matches at least a portion of an externally generated one-time password for the credit/debit card.

7. The method of claim 6 further comprising sending a transaction denial when the dynamic CVV does not match the at least a portion of the one-time password.

8. The method of claim 6 wherein the at least a portion of the one-time password comprises three digits of a six-digit one-time password.

9. The method of claim 6 further comprising:
separating the dynamic CVV from credit/debit card data;
validating the credit/debit card data; and
merging the dynamic CVV with the credit/debit card data to produce the transaction authorization.

10. The method of claim 8 wherein the comparing of the dynamic CVV to the three digits of the six-digit one-time password is accomplished using a united authentication server.

11. The method of claim 6 wherein the dynamic CVV is based at least partially on the challenge response input by the user into the credit/debit card.

* * * * *